United States Patent

[11] 3,596,324

[72] Inventor Elliott Bavers
New York, N.Y.
[21] Appl. No. 873,300
[22] Filed Nov. 3, 1969
[45] Patented Aug. 3, 1971
[73] Assignee Rotodyne Manufacturing Corporation
Brooklyn, N.Y.

[54] EXTERIORLY MOVED MOLD SUPPORT FOR CYCLE-OVERLAP ROTATIONAL MOLDING APPARATUS FOR THERMOPLASTIC ARTICLES

9 Claims, 3 Drawing Figs.

[52] U.S. Cl. 18/26 RR
[51] Int. Cl. B29c 5/04
[50] Field of Search 18/26 RR

[56] References Cited

UNITED STATES PATENTS

| | | | |
|---|---|---|---|
| 2,573,693 | 11/1951 | De Bell | 18/26 |
| 2,811,747 | 11/1957 | Belz | 18/26 |
| 3,337,662 | 8/1967 | Spencer | 18/26RRX |
| 3,381,631 | 5/1968 | Hornlein et al. | 18/26RRX |
| 3,413,687 | 12/1968 | Bavers | 18/26 RR |
| 3,416,193 | 12/1968 | Freeborn | 18/26 RR |
| 3,474,165 | 10/1969 | Rakes et al. | 18/26RRX |

*Primary Examiner*—J. Howard Flint, Jr.
*Assistant Examiner*—D. M. Gurley
*Attorney*—Victor M. Helfand

ABSTRACT: Exteriorly movable mold-supporting means for cycle overlap rotational molding apparatus, consisting of a carriage having spaced movable upright sides, one on the exterior of each side of the apparatus, connected at their lower ends below the apparatus, each having a shaft journaled at its upper end extending into the interior of the apparatus through a continuous gap in the adjacent apparatus wall, and a motor mounted thereon for rotating said shaft, and a U-shaped structure within the apparatus whose two sides are each engaged by one of said shafts, the web of the structure having a platform rotatably mounted thereon for rotation in a plane parallel to said shafts, one of said shafts operatively connected with said platform for rotating the same when said one shaft is rotated, and counterbalancing weights longitudinally adjustably mounted on the sides of the U-shaped structure.

38 40 120 116 18 28 28 58 62 60 90 98 64 94 88 96 108 92 48 48 46 100 102 66 22 56 52 104 110 106 54 52 44 42 12 10 50 10

ELLIOTT BAVERS
*INVENTOR.*

BY [signature]
*ATTORNEY*

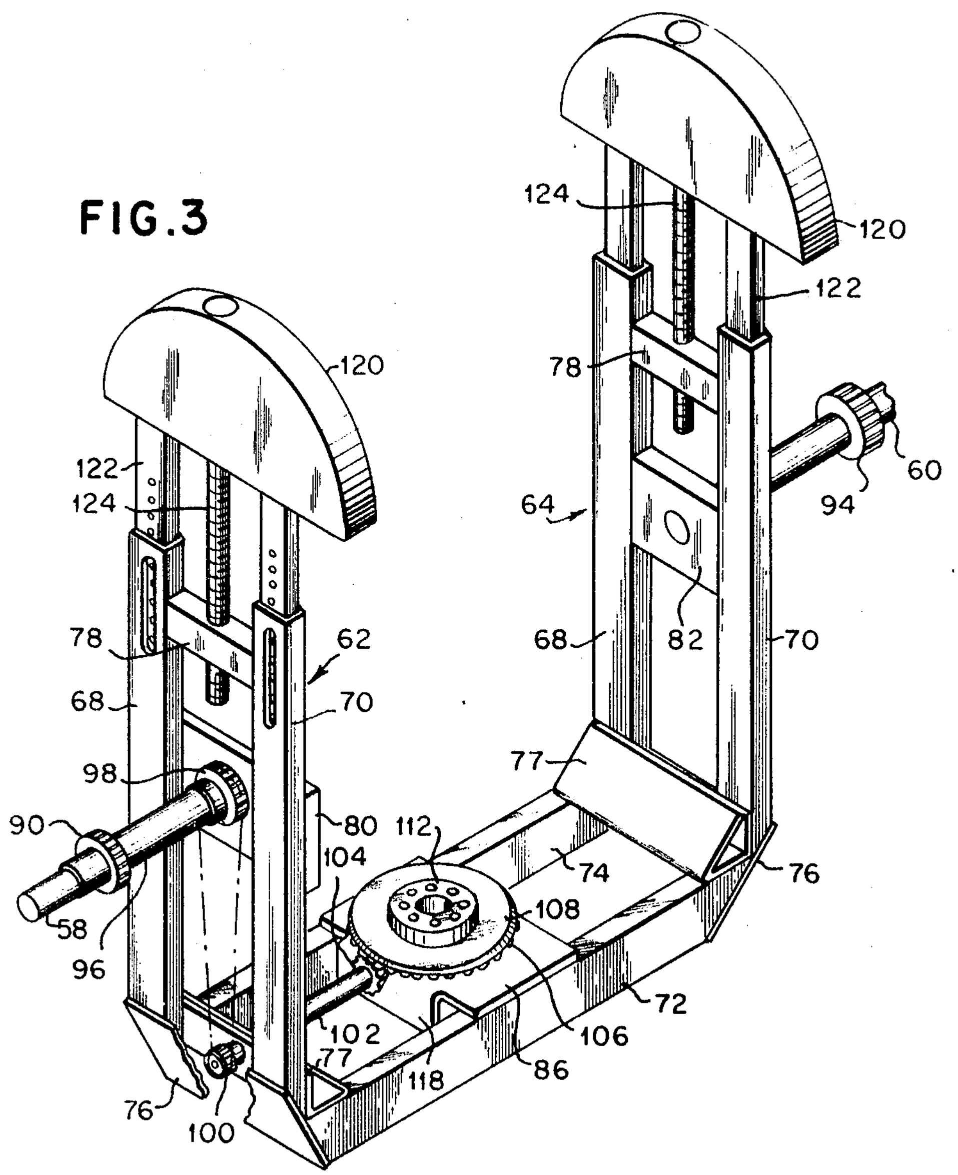
ELLIOTT BAVERS
*INVENTOR.*
BY [signature]
*ATTORNEY*

EXTERIORLY MOVED MOLD SUPPORT FOR CYCLE-OVERLAP ROTATIONAL MOLDING APPARATUS FOR THERMOPLASTIC ARTICLES

The present invention relates to mold supports for use with rotational apparatus for molding thermoplastic articles; and, more particularly, for use with rotational molding apparatus of the character described and claimed in my U.S. Pat. No. 3,413,687 dated Dec. 3, 1968, and in my copending application, Ser. No. 749,673, filed Aug. 2, 1968, now U.S. Pat. No. 3,523,332. More specifically, the present invention relates to mold supports for oversize molds, for use with such rotational molding apparatus.

In my said patent and my said copending application, I have described and claimed rotational molding apparatus capable of handling two molds or sets of molds in overlapping molding cycles, to thereby economically speed up the molding process. Such rotational molding apparatus is described to consist of a central curing chamber with a cooling chamber at each end thereof. The three chambers are described as elevated above a supporting surface and as being formed of upper and lower wall sections separated by a gap; the gap of the three chambers being aligned and continuous. The curing chamber is defined from the cooling chambers by laterally sliding doors. The molds are supported on platforms which are mounted for rotation about a vertical axis on a shaft that is, in turn, journaled for rotation around a horizontal axis; such shaft being supported at both ends on a carriage whose upright sides are movable alongside of the exterior of the sidewalls of the apparatus, with the ends of the shaft disposed and movable in the gaps of the opposed sidewalls of the chambers. The upright sides of the carriage are connected to one another into a unitary structure for movement as a unit at their bottoms, below the walls of the apparatus. The apparatus is described as including a pair of such carriages, each supporting a rotary shaft movable into the curing chamber at the center from one of the cooling chambers at the ends thereof.

It will be obvious that such mold-supporting means as described in my said patent and in my said copending application is useful for rotating molds of an altitude less than half the height of the several chambers. The present invention is directed to the provision of mold-supporting means for the apparatus of my said patent and copending application capable of supporting molds of greater altitude than half the height of the chambers without the necessity for constructing apparatus of excessive chamber height.

It is also an object of the present invention to provide mold-supporting means, of the character described, which may be evenly and smoothly universally rotated, around the two axes, with a minimum of torque, at an even rate of rotation.

The foregoing and other objects and advantages of the mold-supporting means of the present invention will become more readily apparent to those skilled in the art from the embodiment thereof shown in the accompanying drawing from the description following. It is to be understood, however, that such embodiment is shown by way of illustration only, to make the principles and practice of the invention more readily comprehensible, and without any intent of limiting the invention to the specific details shown therein.

In the drawings:

FIG. 3 is an isometric view of the frame for the mold support of the invention.

Figure 1:
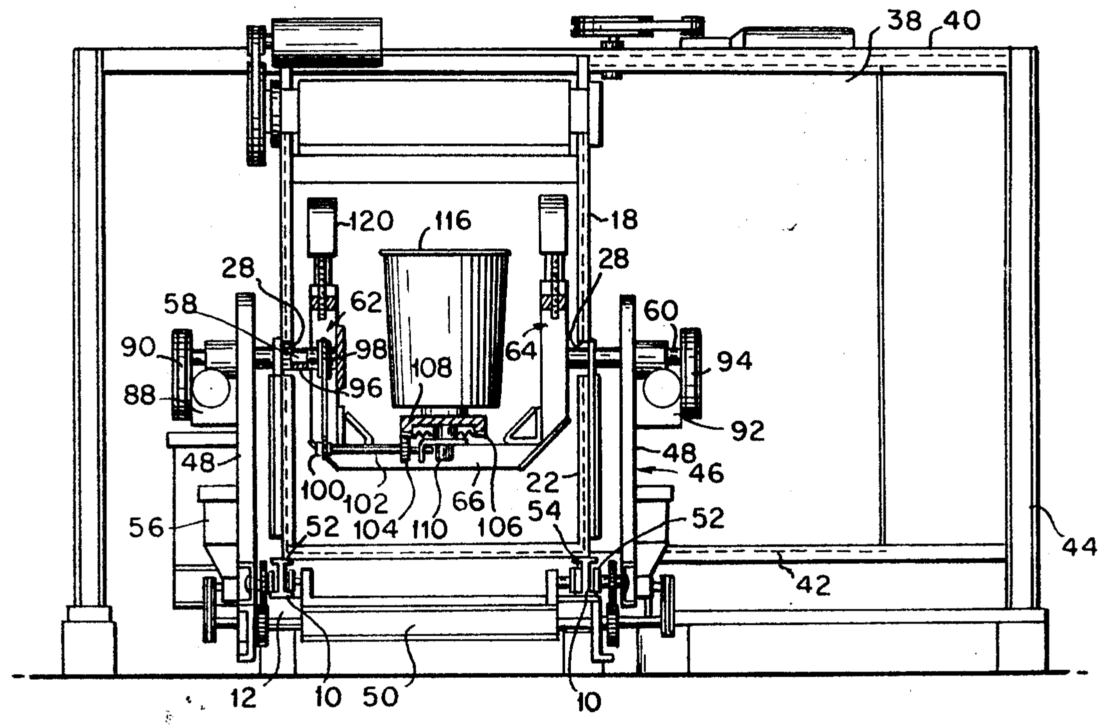
FIG. 1 is a fragmentary, side elevational view of one embodiment of a rotational molding apparatus with which the mold support of the present invention is made to be used.
Figure 2:
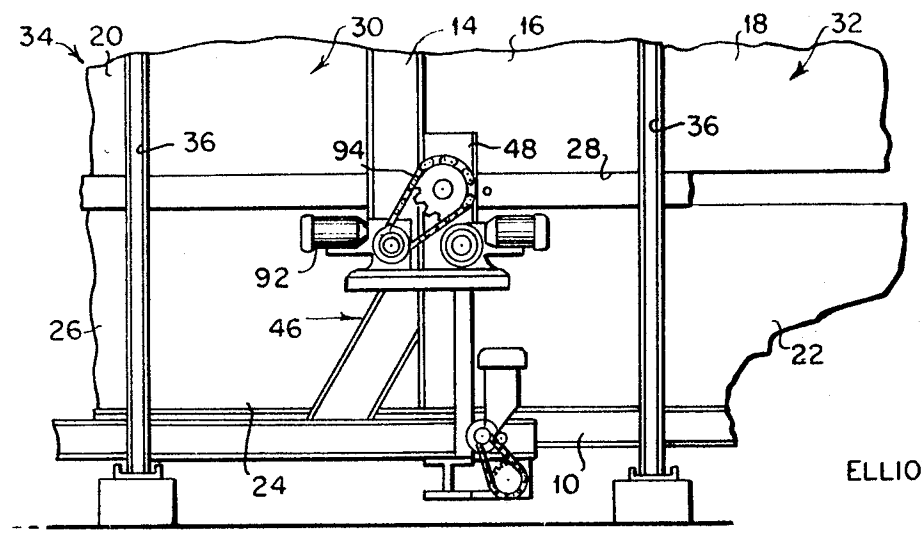
FIG. 2 is an end elevation of the apparatus of FIG. 1, with the mold support of the invention shown in position therein.

Generally stated, the invention adapts the mold support carriage of my said patent and application, for use with oversize molds, by providing a U-shaped mold support frame whose sides are individually connected to shaft sections each of which is journaled for rotation in a side unit of the mold-moving carriage, and each of which is independently rotated by an individual motor, with a rotatable platform mounted on the web of the frame and rotatably connected to one of the shaft sections. The mold support of the invention is further characterized by the provision of a counterbalancing weight adjustably mounted on the ends of the frame sides, to compensate for the variations in the weight of molds and their loads.

Referring now, more specifically, to the accompanying drawings illustrating the present invention, the same show rotational molding apparatus comprising a structure formed of horizontally spaced parallel H-beams, 10, supported, by one side, in elevated relation to a supporting surface, such as a factory floor, by base posts, 12. Each beam 10 supports a number of upright beams, 14, that in turn support the sidewalls of the structure. Each sidewall comprises three laterally spaced upper sidewall sections, 16, 18 and 20, and vertically registering, laterally spaced lower sidewall sections, 22, 24 and 26; the upper and lower wall sections being separated by a horizontal, continuous gap, 28. Central wall sections 18 and 24 define a curing chamber, generally designated as 30, and wall sections 16 and 22, and 20 and 26, define cooling chambers at each end of the curing chamber, generally designated as 32 and 34; the several chambers being separated by vertical spaces, 36. A top wall is provided at least for the curing chamber 30.

Curing chamber 30 may be selectively closed off from each of the cooling chambers 32 and 34 at its ends by doors, 38, supported on top and bottom rails, 40 and 42, the former of which may be supported on upright posts, 44, disposed to each side of the structure; doors 38 being movable in and out of spaces 36 between curing chamber 30 and adjoining cooling chambers 32 and 34. Doors 38 may be manually movable or automatically power driven.

The two mold-supporting and moving units of the present invention each comprises a carriage formed of a pair of upright sides, each generally designated as 46. Each side 46 is disposed exteriorly of a wall of the structure and each includes an upright beam, 48, extending from a point above a gap 28 to a point below the H-beams 10 and the two sides are interconnected below such beams 10 into a carriage unit by transverse beam, 50. Each carriage unit side 46 is movably supported on the lower flanges of an H-beam 10 by a driven wheel, 52, supported on the side 46 resting on the outer flange of the beam and by a second, idler wheel, 54, mounted on the connecting beam 50 and resting on the inner flange of the H-beam 10. A reversible motor, 56, is supported on each upright 46 and operatively connected to the driven wheel 52 by suitable gears, sprockets, and sprocket chains.

The uprights 48 of each carriage side 46 have journaled therein at a level with the adjacent gap 28, a shaft section, 58 and 60, respectively, that projects to each side of the upright 48 and extends through gap 28 into the interior of the structure, where it fixedly engages a mold support member.

Each mold support is of generally U shape frame construction, including spaced parallel sides, generally designated as 62 and 64, respectively, connected at one end by a web, generally designated as 66. The sides 62 and 64 are preferably each formed of spaced parallel members, 68 and 70, and the web of spaced parallel members, 72 and 74. Members 68 and 70 are preferably tubular and preferably of rectangular cross section, as may be members 72 and 74. The connected ends of members 68 and 70 and the ends of members 72 and 74 are preferably mitered and are connected together by exterior plates, 76, and by inner triangular bodies, 77. Members 68 and 70 of each of sides 62 and 64 are also connected at their upper ends by bars, 78, extending between them. Members 68 and 70 of side 62 may be further connected intermediate their ends, as at approximately their midpoint, by a plate, 80, secured on their inner faces. Members 68 and 70 of side 64 may be connected at approximately their midpoint by the bar, 82, extending between them. Members 72 and 74 of the web 66 are connected at their midpoint by a plate, 86, secured to their inner surfaces.

Frame side 62 is fixedly secured to shaft section 58 by plate 80 and side 64 is fixedly secured to shaft section 60 by bar 82. Shaft section 58 is driven by motor, 88, mounted on the side 46 in which it is journaled, as by means of appropriate pulleys and belt, 90. Similarly, shaft section 60 may be driven by motor, 92, mounted on supporting side 46, as by means of pulley wheels and belt, 94. Shaft section 58 may carry a collar, 96, at its inner end, on which is secured a sprocket, 98, disposed between members 68 and 70, which is operatively connected, as by a sprocket chain, to sprocket, 100, at the end of a shaft, 102, which may be journaled in any desired manner adjacent the bottom of the frame side 62, as in the upright and diagonal sides of the reinforcing cornerpiece, 77. Shaft 102 carries a pinion, 104, at its inner end which engages dependent teeth, 106, on the circular platform, 108, journaled at its center by depending shaft, 110, in plate 86. Platform 108 may have a raised circular center, 112, formed with openings, 114, to which the bottom of a mold, 116, may be secured. Means may be provided for supporting the inner end of shaft 102, as in the depending apron, 118, on plate 86.

In order to compensate for any variation in height and weight of a mold 116 that may be the result of variation in mold shape and the weight of its load, adjustable counterbalancing means may be provided at the free ends of frame sides 64 and 62. Preferably, such counterbalancing means may comprise weights, 120, having spaced depending rods, 122, each of which fits slidably into one of the hollow members 68 and 70 of each frame side. Adjustability may be provided in any desired manner, as the depending screw, 124, set into each of weights 120, which threads in a suitably threaded opening formed in bars 78, such screws being rotatable in such threaded openings to raise and lower the weights 120.

This completes the description of the mold-supporting structure of the present invention for the rotational molding apparatus for which it is intended. In operation, when each carriage is moved, in its turn, into the curing chamber 30, motors 88 and 92 are set into operation to rotate shaft sections 58 and 60, each rotate the mold support unit around the shaft sections as an axis. Rotation of shaft section 58 rotates sprockets 98 mounted around it, which, in turn, rotates sprocket 100 on shaft 102 whose pinion 104 rotates mold-mounting platform 104, to rotate the mold on an axis at right angles to the axis of rotation of the unit as a whole.

This completes the description of the mold-supporting unit of the present invention. It will be readily apparent that such unit is highly suitable for use with oversized molds; that, because of the individual synchronized motors used for rotating the mold support unit, the same will be rotated smoothly and evenly without any torsion and without any undue strain on the unit; that such smooth and even rotation of the mold unit is enhanced by the adjustable counterbalancing weights provided at the end of the frame of the unit, regardless of the distribution of the mold weight. It will also be apparent that the mold-supporting means of the present invention is of relatively simple construction, simple and easy to operate, and highly suitable for automatic operation, and control.

It will be further apparent that numerous variations and modifications may be made in the mold support unit of the present invention by anyone skilled din the art, in accordance with the principles of the invention hereinabove set forth, without the exercise of any inventive ingenuity.

What I claim is:

1. Mold-supporting and moving means for rotational molding apparatus of the character described, said apparatus including a curing chamber and a cooling chamber at least at one end of said curing chamber, said chambers including upright sidewalls formed of vertically spaced sections providing a continuous guideway, mold-supporting and moving means comprising a carriage consisting of a pair of upright structures one on the exterior of each of said walls, said upright structures connected at one end into a carriage unit, means reciprocally moving said carriage alongside said walls, including at least one wheel at said connected ends of said upright structures, and a reversible motor mounted on each of said upright structures operatively connected with the adjacent of said wheels for rotating the same, said uprights each extending alongside of the adjacent of said guideways and having a shaft section journaled therein and extending through said guideway into the interior of the apparatus, a U-shaped body including spaced sides connected by a web at one end, said body having each of its said sides fixedly connected at midpoint to one of said shaft sections, a motor mounted on each of said upright structures of said carriage for rotating the shaft section journaled therein, a mold-mounting platform rotatably supported on said web and means operatively connecting said platform to one of said shaft sections for rotation of said platform upon rotation of said one shaft section.

2. The mold-supporting and moving means of claim 1, wherein counterbalancing weight means is supported on said U-shaped body, at its open end, for adjustable movement toward and away from the point of connection of its sides to said shaft section.

3. The mold-supporting and moving means of claim 2, wherein said counterbalancing weight means comprises individual weights mounted on each of said sides of said U-shaped body.

4. The mold-supporting and moving means of claim 1, wherein said sides and said web of said U-shaped body are formed of spaced parallel rods and means connecting said rods to one another at their ends and at their midpoints by members disposed at right angles thereto.

5. The mold-supporting and moving means of claim 4, wherein an individual counterbalancing weight is adjustably supported on each said side at its free end for movement toward and away from said end, each said counterbalancing weight including arms extending therefrom, each arm adjustably engageable on one of the rods of the side on which it is mounted.

6. The mold-supporting and moving means of claim 5, wherein said rods are hollow and said arms of said counterweights extend into the interior of said rods.

7. The mold-supporting and moving means of claim 4, wherein said rods of said web are connected by a plate secured thereto, said mold-mounting platform rotatably supported on said plate for rotation on a plane parallel to said plate, and the means operatively connecting said platform to said one shaft section comprises a circular gear on said platform, a shaft journaled in said body, said shaft having a pinion at one end engaging said circular gear, a wheel at its other end, and a wheel on said one shaft, and means interconnecting said wheels for simultaneous rotation.

8. The mold-supporting and moving means of claim 7, wherein said wheels comprise sprocket wheels and said means connecting them comprise a sprocket chain.

9. The mold-supporting and moving means of claim 8, wherein said means connecting said side mounted on said one shaft section at this midpoint comprises a bar secured to the rods of said side on their inner surface, said one shaft section secured to said bar, and the means connecting the ends of the rods of said web to the rods of said side includes a triangular body having one side connected to said web rods and its other side to said side rods, said shaft journaled in said triangular connecting body, said wheels on said shaft section disposed between said rods of said side.